US011187967B2

(12) United States Patent
Xiao et al.

(10) Patent No.: US 11,187,967 B2
(45) Date of Patent: Nov. 30, 2021

(54) FILL LIGHT DEVICE, METHOD FOR CONTROLLING FILL LIGHT DEVICE, AND COMPUTER STORAGE MEDIUM

(71) Applicant: SHENZHEN TRANSSION HOLDINGS CO., LTD., Shenzhen (CN)

(72) Inventors: Ming Xiao, Shenzhen (CN); Lingzhi Li, Shenzhen (CN); Haibin Wang, Shenzhen (CN); Zihui Zhao, Shenzhen (CN); Binjie Zhu, Shenzhen (CN); Wenhui Dai, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 0 days.

(21) Appl. No.: 16/976,747

(22) PCT Filed: Mar. 27, 2020

(86) PCT No.: PCT/CN2020/081607
§ 371 (c)(1),
(2) Date: Jun. 10, 2021

(87) PCT Pub. No.: WO2021/109374
PCT Pub. Date: Jun. 10, 2021

(65) Prior Publication Data
US 2021/0311374 A1 Oct. 7, 2021

(30) Foreign Application Priority Data
Dec. 4, 2019 (CN) .......................... 201911230349.3

(51) Int. Cl.
*G03B 15/05* (2021.01)
*H04N 5/235* (2006.01)
*H04N 5/232* (2006.01)

(52) U.S. Cl.
CPC ........... *G03B 15/05* (2013.01); *H04N 5/2354* (2013.01); *H04N 5/23216* (2013.01); *H04N 5/23219* (2013.01)

(58) Field of Classification Search
CPC ........... H04N 5/23219; H04N 5/23216; H04N 5/2354; H04N 13/32; H04N 13/376;
(Continued)

(56) References Cited

U.S. PATENT DOCUMENTS 10,015,391 B2 * 7/2018 de Leon ............ G06K 9/00604
10,544,921 B2 * 1/2020 Li ............................ F21V 14/00
(Continued)

FOREIGN PATENT DOCUMENTS

CN       1953513 A     4/2007
CN     101607520 A    12/2009
(Continued)

OTHER PUBLICATIONS

First Office Action in counterpart Chinese Application No. 201911230349.3, dated Aug. 5, 2020.
(Continued)

*Primary Examiner* — Michael S Osinski
(74) *Attorney, Agent, or Firm* — Westbridge IP LLC (57) ABSTRACT

The present disclosure provides a fill light device, a method for controlling a fill light device, and a computer readable storage medium. The fill light device includes a flash light; and a light guide, the light guide being located on a light-exiting side of the flash light and being configured to be controlled to change a shape and/or a light-transmitting area to change a light-exiting area and/or a light-emitting angle of the fill light device. The method includes: obtaining a control parameter of the light guide; and changing a shape and/or a light-transmitting area of the light guide according to the control parameter to change a light-exiting area and/or
(Continued)

a light-emitting angle of the fill light device. In this way, the light-exiting area and/or the light-emitting angle of the fill light device can be controlled to meet the fill light requirements in different capturing scenarios.

12 Claims, 4 Drawing Sheets

(58) Field of Classification Search
CPC .. H04N 13/302; H04N 13/305; H04N 13/354; H04N 13/366; H04N 13/368; H04N 13/373; H04N 13/383; H04N 5/2254; H04N 5/2258; H04N 5/23229; H04N 5/23254; H04N 5/23258; G02B 27/0172; G02B 27/0093; G02B 2027/0178; G02B 2027/0187; G02B 2027/0118; G02B 2027/0123; G03B 15/05; G06F 3/013; G06F 3/011; G06F 3/012; G06F 3/0346; G02F 1/29; G02F 1/294; G02F 1/0136; G02F 1/13306; G02F 1/13336
See application file for complete search history.

(56) References Cited

U.S. PATENT DOCUMENTS

| | | | | |
|---|---|---|---|---|
| 10,554,890 | B1* | 2/2020 | Le | H04N 5/2621 |
| 10,754,031 | B2* | 8/2020 | Chueh | G01S 7/4911 |
| 10,805,551 | B2* | 10/2020 | Sun | G03B 30/00 |
| 2009/0033204 | A1* | 2/2009 | Wang | H01L 33/08 |
| | | | | 313/498 |
| 2009/0252485 | A1* | 10/2009 | Tsuchiya | G02B 3/08 |
| | | | | 396/200 |
| 2010/0149313 | A1* | 6/2010 | Kroll | G03H 1/2294 |
| | | | | 348/40 |
| 2012/0154378 | A1* | 6/2012 | Kitchens | H04N 13/31 |
| | | | | 345/419 |
| 2013/0135513 | A1* | 5/2013 | Choi | H04N 5/2256 |
| | | | | 348/335 |
| 2013/0258281 | A1* | 10/2013 | Pirie | A61B 3/0008 |
| | | | | 351/206 |
| 2013/0278819 | A1 | 10/2013 | Liaw | |
| 2013/0321913 | A1* | 12/2013 | Harrold | G02B 30/26 |
| | | | | 359/464 |
| 2014/0009508 | A1* | 1/2014 | Woodgate | G02B 30/26 |
| | | | | 345/690 |
| 2014/0176684 | A1* | 6/2014 | Varela | H04N 13/378 |
| | | | | 348/51 |
| 2014/0333735 | A1* | 11/2014 | Bathiche | H04N 13/368 |
| | | | | 348/54 |
| 2015/0277551 | A1* | 10/2015 | Travis | G02B 6/0035 |
| | | | | 345/156 |
| 2016/0041384 | A1* | 2/2016 | Robbins | G06F 3/013 |
| | | | | 345/156 |
| 2016/0255338 | A1* | 9/2016 | Song | H04N 13/139 |
| | | | | 348/47 |
| 2017/0038589 | A1* | 2/2017 | Jepsen | G09G 3/3426 |
| 2017/0176753 | A1* | 6/2017 | Shi | G02F 1/137 |
| 2018/0131926 | A1* | 5/2018 | Shanks | H04N 13/344 |
| 2018/0320860 | A1* | 11/2018 | Li | F21V 14/003 |
| 2018/0356638 | A1* | 12/2018 | Yang | G06F 3/147 |
| 2019/0208188 | A1* | 7/2019 | Wang | H04N 13/32 |
| 2020/0081252 | A1* | 3/2020 | Jamali | G02B 27/0172 |
| 2021/0116776 | A1* | 4/2021 | Jiang | C09K 19/58 |
| 2021/0176438 | A1* | 6/2021 | Navarro Fructuoso | G02B 27/0172 |

FOREIGN PATENT DOCUMENTS

| | | |
|---|---|---|
| CN | 101852396 A | 10/2010 |
| CN | 102081279 A | 6/2011 |
| CN | 103916584 A | 7/2014 |
| CN | 105842958 A | 8/2016 |
| CN | 106842774 A | 6/2017 |
| CN | 107427211 A | 12/2017 |
| CN | 108162729 A | 6/2018 |
| CN | 108873444 A | 11/2018 |
| CN | 109194858 A | 1/2019 |
| CN | 110248009 A | 9/2019 |
| CN | 110325446 A | 10/2019 |
| CN | 110418069 A | 11/2019 |
| CN | 110488524 A | 11/2019 |
| KR | 20070043442 A | 4/2007 |

OTHER PUBLICATIONS

International Search Report and Written Opinion in corresponding PCT Application No. PCT/CN2020/081607, dated May 29, 2020.

\* cited by examiner

FILL LIGHT DEVICE, METHOD FOR CONTROLLING FILL LIGHT DEVICE, AND COMPUTER STORAGE MEDIUM

CROSS-REFERENCE TO RELATED APPLICATIONS

This application is the National Phase of PCT Application No. PCT/CN2020/081607, filed on Mar. 27, 2020, which claims priority to Chinese Application No. 201911230349.3, filed on Dec. 4, 2019, filed by SHENZHEN TRANSSION HOLDINGS CO., LTD., entitled "FILL LIGHT DEVICE, METHOD FOR CONTROLLING FILL LIGHT DEVICE, AND COMPUTER STORAGE MEDIUM", the entire disclosure of which is incorporated herein by reference.

TECHNICAL FIELD

The present disclosure relates to the technical field of fill light, and in particular, to a fill light device, a method for controlling a fill light device and a computer storage medium.

BACKGROUND

The flash light is a common component in a photographing device, which is used to fill the capturing environment in a darker situation or when the lighting effect is poor, to assist in completing the photograph. Generally, the working process of the existing flash light is that when the flash light is turned on, the camera preview is opened, the shutter is clicked during the preview process, the flash light is powered on to perform the flash fill light action, and the capturing background is illuminated. Since the brightness and depth of the background are affected by the main light source, the higher the brightness of the flash light, the better the brightening effect. But as the brightness of the flash light increases, the ability of the subject's eyes to withstand the light is also being tested. In order to protect the eyes of the subject, the brightness of the flash light cannot be too bright, resulting in a limited actual fill light intensity. Besides, the light-emitting angle of the existing flash light is fixed, it cannot illuminate distant objects, and the fill light range is limited. Therefore, the existing flash light cannot meet the fill light requirements in different capturing scenarios.

SUMMARY

In view of the above technical problems, the present disclosure provides a fill light device, a method for controlling a fill light device and a computer storage medium, which can control the light-exiting area or the light-emitting angle of the fill light device to meet the fill light requirements in different capturing scenarios.

In order to achieve the above objective, the present disclosure provides a fill light device, including:

a flash light; and a light guide, the light guide being located on a light-exiting side of the flash light and being configured to be controlled to change a shape and/or a light-transmitting area to change a light-exiting area and/or a light-emitting angle of the fill light device.

In an embodiment, the light guide includes a first polarizer, a liquid crystal layer, and a second polarizer arranged in sequence, the light guide is connected to a liquid crystal driving module, and the liquid crystal driving module is configured to control an orientation of a liquid crystal of the liquid crystal layer to change the light-transmitting area of the fill light device.

In an embodiment, the light guide is connected to a deformation driving assembly, and the deformation driving assembly is configured to drive the light guide to deform to change the shape of the light guide.

In an embodiment, the deformation driving assembly includes magnets, a coil, and a driving ring, the driving ring is configured to surround the light guide one circle, the coil is configured to surround the driving ring, the magnets are located on opposite sides of the driving ring, and the driving ring is driven to push up the light guide for deformation when the coil is energized.

In an embodiment, the fill light device further includes a diastimeter for detecting a distance between a capturing target and the fill light device, thereby the fill light device is configured to change the shape of the light guide according to the distance to change the light-emitting angle of the fill light device.

In an embodiment, the fill light device further includes an identification module, the identification module is configured to identify a pupil in a preview image and determine a position of the pupil, thereby the fill light device is configured to change the light-transmitting area of the light guide according to the position of the pupil to change the light-exiting area of the fill light device.

The present disclosure further provides a method for controlling a fill light device, the fill light device including a flash light and a light guide, the light guide being located on a light-exiting side of the flash light, the method includes:

obtaining a control parameter of the light guide; and changing a shape and/or a light-transmitting area of the light guide according to the control parameter to change a light-exiting area and/or a light-emitting angle of the fill light device.

In an embodiment, the operation of obtaining a control parameter of the light guide includes:

obtaining a preview image of a camera module;

identifying a pupil in the preview image; and determining a light-shielding area of the light guide according to a position of the pupil to obtain the control parameter after the pupil in the preview image is identified.

In an embodiment, the method further includes:

controlling the flash light to pre-flash at a preset power for a preset number of times or controlling the flash light to continue lighting during a process of obtaining the preview image.

In an embodiment, the light guide includes a first polarizer, a liquid crystal layer, and a second polarizer arranged in sequence, and the operation of changing a shape and/or a light-transmitting area of the light guide according to the control parameter includes:

controlling an orientation of a liquid crystal of the liquid crystal layer according to the light-shielding area, thereby the light guide is opaque in the light-shielding area.

In an embodiment, the fill light device further includes a diastimeter for detecting a distance between a capturing target and the fill light device, and the operation of obtaining a control parameter of the light guide includes:

obtaining the distance between the capturing target and the fill light device; and obtaining a first preset light-emitting angle as a target light-emitting angle to obtain the control parameter, or obtaining a light-emitting angle corresponding to the distance as a target light-emitting angle to obtain the control parameter, in response to a determination that the distance is greater than or equal to a preset distance.

In an embodiment, the operation of obtaining a control parameter of the light guide further includes:

obtaining a second preset light-emitting angle as a target light-emitting angle to obtain the control parameter in response to a determination that the distance is less than the preset distance, the second preset light-emitting angle being greater than the first preset light-emitting angle.

In an embodiment, the light guide is connected to a deformation driving assembly for driving the light guide to deform, and the operation of changing a shape and/or a light-transmitting area of the light guide according to the control parameter includes:

determining a driving stroke of the deformation driving assembly according to the target light-emitting angle; and controlling the deformation driving assembly to drive the light guide to deform according to the driving stroke to change the shape of the light guide.

In an embodiment, the deformation driving assembly includes magnets, a coil, and a driving ring, the driving ring is configured to surround the light guide one circle, the coil is configured to surround the driving ring, and the magnets are located on opposite sides of the driving ring, and the operation of controlling the deformation driving assembly to drive the light guide to deform according to the driving stroke includes:

obtaining an energizing current of the coil according to the driving stroke; and energizing the coil according to the energizing current, thereby the driving ring is driven to push up the light guide for deformation.

In an embodiment, after the operation of changing a shape and/or a light-transmitting area of the light guide according to the control parameter to change a light-exiting area and/or a light-emitting angle of the fill light device, the method further includes:

controlling the flash light to flash or continue lighting according to a capturing operation or a lighting operation.

The present disclosure further provides a computer storage medium. A computer program instruction is stored on the computer storage medium, the computer program instruction, when executed by a processor, implements the method for controlling the fill light device as described above.

The fill light device of the present disclosure includes a flash light and a light guide, the light guide being located on a light-exiting side of the flash light and being configured to be controlled to change a shape and/or a light-transmitting area to change a light-exiting area and/or a light-emitting angle of the fill light device. The method for controlling the fill light device includes obtaining a control parameter of the light guide; and changing a shape and/or a light-transmitting area of the light guide according to the control parameter to change a light-exiting area and/or a light-emitting angle of the fill light device. In this way, the light-exiting area and/or the light-emitting angle of the fill light device can be controlled to meet the fill light requirements in different capturing scenarios.

DETAILED DESCRIPTION OF THE EMBODIMENTS

The following describes the implementation of the present disclosure through specific embodiments. Those skilled in the art can easily understand the other advantages and effects of the present disclosure through the contents disclosed in the present disclosure.

In the following description, referring to the drawings, the drawings describe several embodiments of the present disclosure. It should be understood that other embodiments may be used, and that changes in mechanical composition, structure, electrical, and operation may be made without departing from the spirit and scope of the present disclosure. The following detailed description should not be considered to limit the present disclosure, and the terminology used herein is for describing particular embodiments only, and is not intended to limit the present disclosure.

Although the terms first, second, etc. are used herein to describe various elements in some examples, these elements should not be limited by these terms. These terms are only used to distinguish one element from another.

Besides, as used herein, the singular forms "a", "an" and "the" are intended to include the plural forms unless the context indicates otherwise. It should be further understood that the terms "comprising" and "including" indicate the presence of the described features, steps, operations, elements, components, items, categories, and/or groups, and do not exclude the presence, appearance, or addition of one or more other features, steps, operations, elements, components, items, categories, and/or groups. Therefore, "A, B or C" or "A, B and/or C" means any of the following: A; B; C; A and B; A and C; B and C; A, B and C. Exceptions to this definition only occur when combinations of elements, functions, steps, or operations are inherently mutually exclusive in certain ways.

First Embodiment

Figure 1:
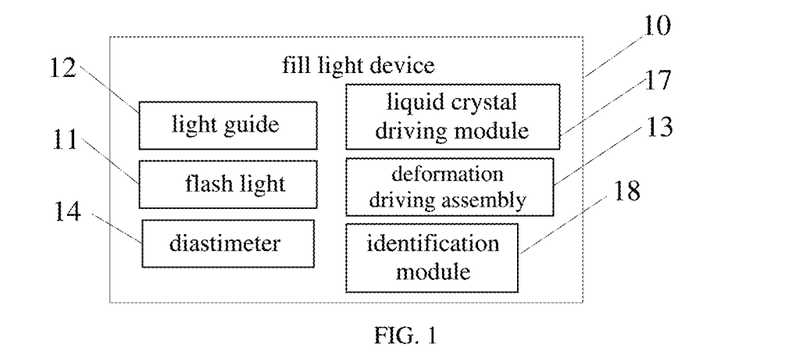
FIG. 1 is a schematic structural diagram of a fill light device according to a first embodiment of the present disclosure.
Figure 2:
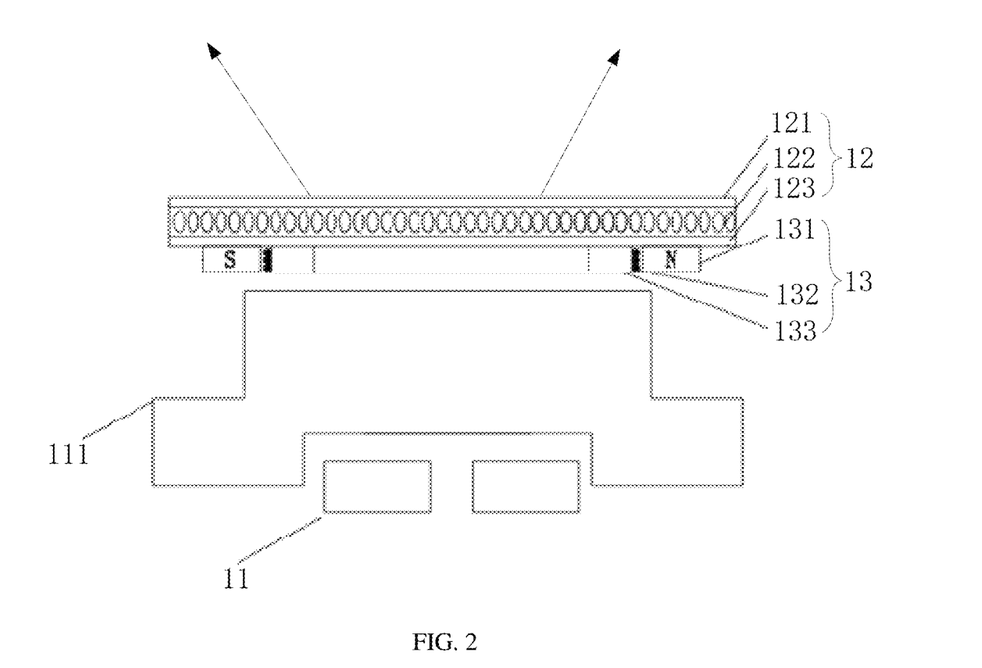
FIG. 2 is a schematic structural diagram of the fill light device when it is in an initial state according to the first embodiment of the present disclosure.

FIG. 1 is a schematic structural diagram of a fill light device according to a first embodiment of the present disclosure. FIG. 2 is a schematic structural diagram of the fill light device when it is in an initial state according to a first embodiment of the present disclosure. Refer to FIG. 1 and FIG. 2, a fill light device 10 of this embodiment includes a flash light 11 and a light guide 12. The light guide 12 is located on a light-exiting side of the flash light 11. A shape and/or a light-transmitting area of the light guide may be controlled to change a light-exiting area and/or a light-emitting angle of the fill light device 10, thereby providing better fill light effect.

The flash 11 is provided with a transparent lampshade 111. The number of the flash light 11 may be one, two or more, and are arranged according to a specific structure to achieve a suitable light-emitting effect. For example, when the number is two, the flash lights are in parallel; when the number is four, two by two are arranged in a matrix.

Figure 3:
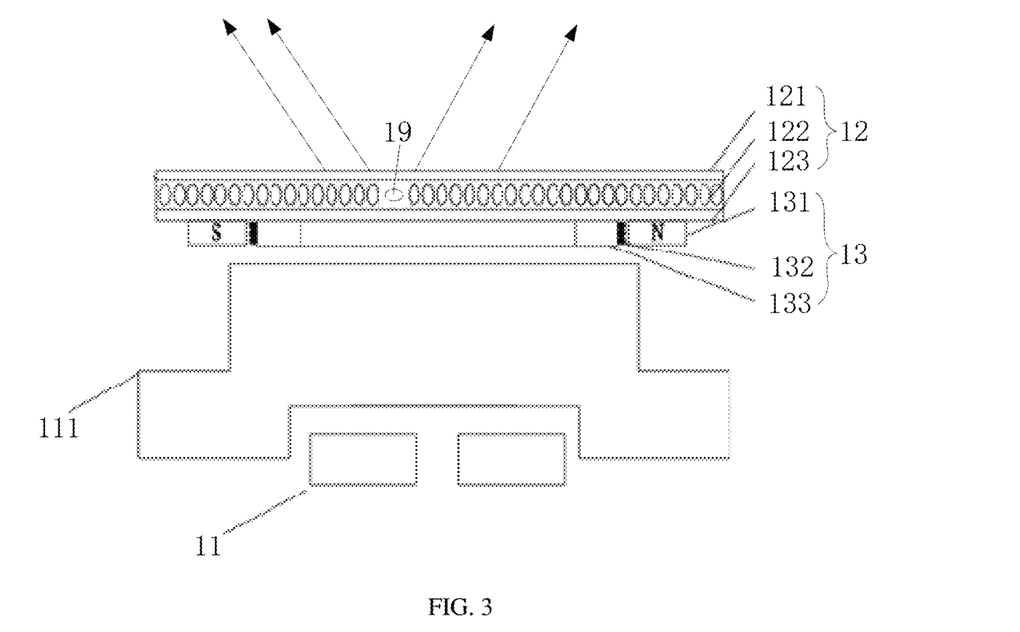
FIG. 3 is a schematic structural diagram of the fill light device when it is in a human eye protection state according to the first embodiment of the present disclosure.

The light guide 12 is configured to emit the light of the flash light 11 and guide the direction of the light. In this embodiment, the light guide 12 includes a first polarizer 121, a liquid crystal layer 122, and a second polarizer 123 arranged in sequence. The light guide 12 is connected to the liquid crystal driving module 17. The liquid crystal driving module 17 is configured to control the arrangement direction of the liquid crystal of the liquid crystal layer 122 to change the light-transmitting area of the light guide 12. The light output directions of the first polarizer 121 and the second polarizer 123 are parallel. When the liquid crystal in the liquid crystal layer 122 is twisted by 0° from the second polarizer 123 side to the first polarizer 121 side, the light of the flash light 11 can exit from the light guide 12. Conversely, if it is twisted by 90°, the light guide 12 is in the opaque state, and the light of the flash light 11 cannot be emitted. Therefore, by controlling the alignment direction of at least a part of the liquid crystals in the liquid crystal layer 122, the light can be partially blocked, thereby changing the light-transmitting area of the light guide 12 to achieve the purpose of changing the light-exiting area of the fill light device 10. As shown in FIG. 3, when a part of the liquid crystal 19 of the liquid crystal layer 122 changes the arrangement direction and the corresponding area of the light guide 12 is opaque, the light emitted from the flash light 11 is divided into two areas.

During designing, the liquid crystal layer 122 may be rubbed and aligned to maintain the initial state of the liquid crystal at a 0° twisted state. That is, in the initial state, the light of the flash light 11 may be emitted without obstruction, reducing the energy consumption of controlling the liquid crystal. On this basis, when it is necessary to adjust the light-exiting area of the fill light device 10, the liquid crystal at the corresponding position is controlled to achieve light shielding. It may be understood that the initial twist state of the liquid crystal can be adjusted according to the angle between the light exit directions of the first polarizer 121 and the second polarizer 123, and is not limited thereto. The light-transmitting area of the light guide 12 can also be controlled by the electrochromic layer. For example, by making the electrochromic layer in a light-transmitting state when not energized, and in an opaque state when energized, therefore, the light-transmitting area of the light guide 12 can be changed through controlling the energization state of at least a part of the electrochromic layer, thereby changing the light-exiting area of the fill light device 10.

Figure 4:
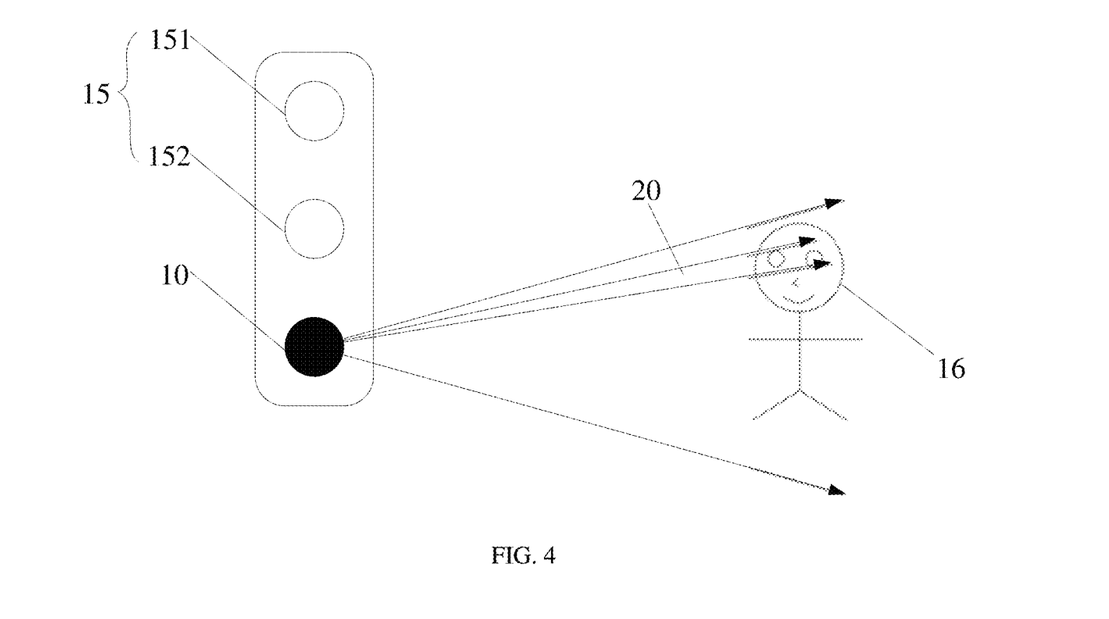
FIG. 4 is a schematic diagram of the effect of the fill light device when it is in a human eye protection state according to the first embodiment of the present disclosure.

Human eye protection can be achieved by changing the light-exiting area of the fill light device 10. In this embodiment, the fill light device 10 further includes an identification module 18. The identification module 18 is configured to identify a pupil in a preview image and determine a position of the pupil, thereby the fill light device 10 is configured to change the light-transmitting area of the light guide 12 according to the position of the pupil to change the light-exiting area of the fill light device 10, so as to avoid the human eye when the flash light 11 flashes. When in use, after the preview image of the camera module is turned on, the face recognition algorithm is started synchronously to perform face detection on the preview image. When the face is found in the preview image, pupil recognition is further performed, and if the recognition is successful, the position of the pupil is determined, and then the light-shielding area of the light guide 12 is determined according to the pupil position. Then, the fill light device 10 controls the liquid crystal in the liquid crystal layer 122 on the light guide 12 to deflect the liquid crystal corresponding to the light-shielding area to block light, thereby changing the light-exiting area of the light guide 12. When the shutter is clicked to start taking a photo, the fill light device 10 receives the photo signal sent, and the flash 11 is energized to start lighting. As shown in FIG. 4, part of the light is blocked to avoid directly illuminating the eye area 20, while ensuring the fill light intensity so that the eyes of the capturing target 16 will not feel the stimulation, so as to realize human eye protection, and improve the red eye phenomenon.

When the preview image is turned on, the flash light 11 is controlled to pre-flash at a preset power for a preset number of times or to continue lighting, such that the camera module can capture the image in a dark environment. The recognition module 18 is allowed to perform accurate pupil recognition, the preset power is less than the power when the flash light 11 is flashing.

Refer to FIG. 1 and FIG. 2 again, in the initial state, the light guide 12 is in a planar state, and the light-emitting angle is the largest. The light guide 12 is connected to the deformation driving assembly 13. The deformation driving assembly 13 is configured to drive the light guide 12 to be bent and deformed to change the shape of the light guide 12, thereby change the light-emitting angle of the fill light device 10.

Figure 5:
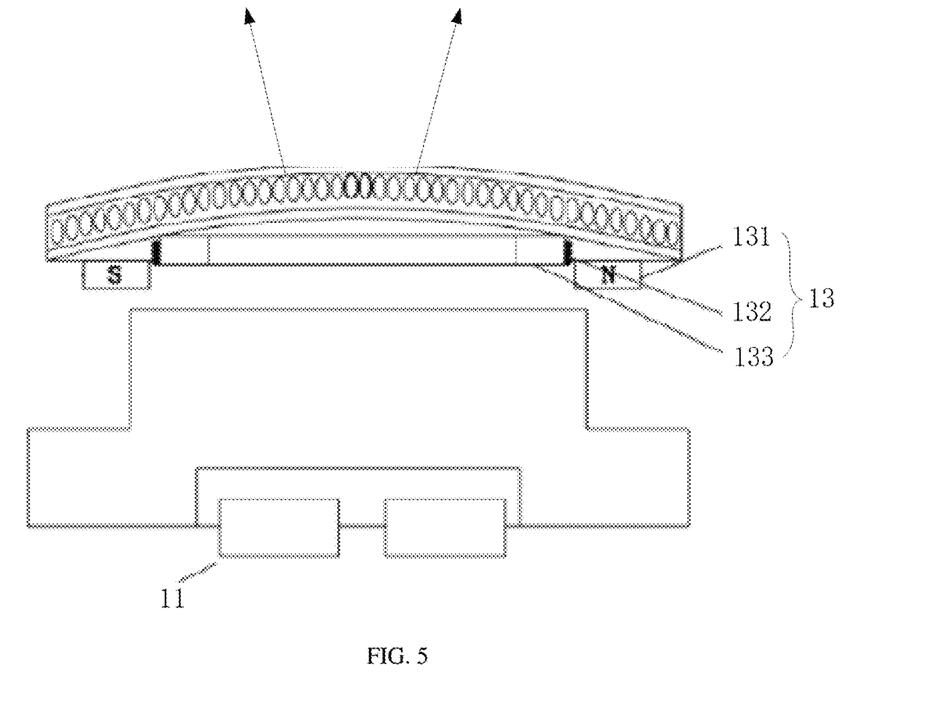
FIG. 5 is a schematic structural diagram of the fill light device when it is in a distant capturing state according to the first embodiment of the present disclosure.

In this embodiment, the deformation driving assembly 13 includes a magnet 131, a coil 132 and a driving ring 133. The driving ring 133 makes one turn around the light guide 12. The coil 132 is around the driving ring 133. The magnets 131 are located on opposite sides of the driving ring 133. As shown in FIG. 5, when the coil 132 is energized, a magnetic field is induced with the magnet 131. A Lorentz force is provided to the driving ring 133 through magnetic induction, so that the driving ring 133 moves upward to push up the light guide 12 to be bended and deformed. When the driving ring 133 pushes up the light guide 12 to form a convex lens shape, the light is condensed and the light emitting angle is narrowed, and the light can be irradiated to a farther range. The deformation control of the light guide 12 can also be achieved through electrode driving, etc. The use of the magnet 131, the coil 132 and the driving ring 133 can reduce the size of the deformation driving assembly 13 and save the internal space of the fill light device 10.

Figure 6:
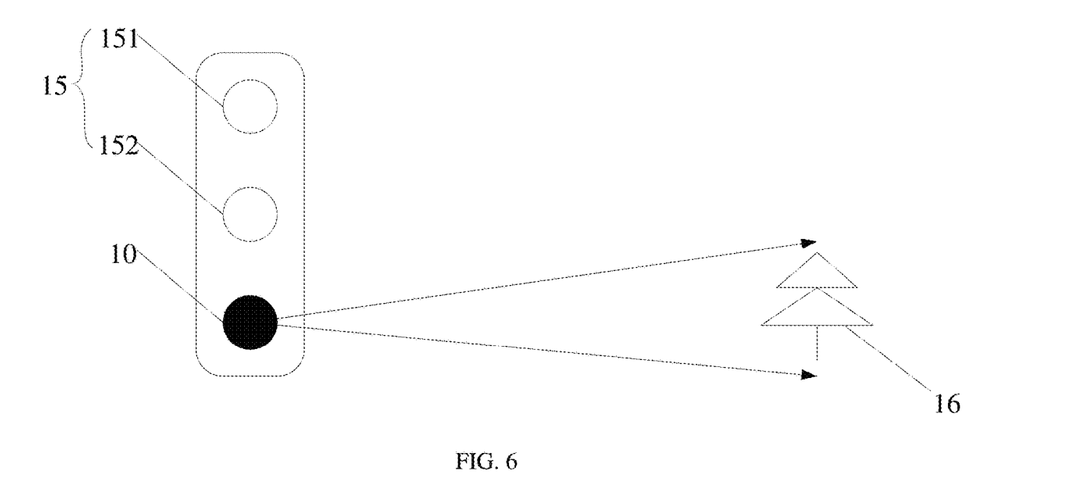
FIG. 6 is a schematic diagram of the effect of the fill light device when it is in a distant capturing state according to the first embodiment of the present disclosure.

By changing the light-emitting angle of the fill light device 10, it is possible to switch the light between the far and near scenes. In this embodiment, the fill light device 10 further includes a diastimeter 14 for detecting a distance between a capturing target and the fill light device 10, thereby the fill light device 10 is configured to change the shape of the light guide 12 according to the distance to change the light-emitting angle of the fill light device 10. The diastimeter 14 may be, for example, a laser diastimeter or an infrared diastimeter. When in use, the diastimeter 14 detects the distance between the capturing target and the fill light device 10. When the distance is greater than or equal to the preset distance, the first preset light-emitting angle is obtained as the target light-emitting angle, or the light-emitting angle corresponding to the distance is obtained as the target light-emitting angle. When the distance is less than the preset distance, a second preset light-emitting angle is obtained as the target light-emitting angle. The second preset light-emitting angle is greater than the first preset light-emitting angle. Then, the driving stroke of the deformation driving assembly 13 is determined according to the target light-emitting angle, and the deformation driving assembly 13 is controlled to drive the light guide 12 to perform bending deformation according to the driving stroke. That is, the energizing current of the coil 132 is obtained according to the driving stroke, and the coil 132 is energized according to the energizing current, so that the driving ring 133 is driven to move a corresponding distance to push up the light guide 12 for bending, thereby changing the shape of the light guide 12. For example, the preset distance is 1 m, when the distance between the capturing target 16 and the fill light device 10 is less than or equal to 1 m, it is switched to the close-range capturing state, and the light guide 12 does not bend to realize the light divergence of the flash light 11. When the distance between the capturing target 16 and the fill light device 10 is greater than 1 m, it is switched to the distant capturing state, and the light guide 12 is bent to realize the light gathering of the flash light 11. When the shutter is clicked to start taking a photo, the fill light device 10 receives the photo signal, and the current starts to light up. As shown in FIG. 6, since the light guide 12 is bent into a convex lens shape, the light-emitting angle of the fill light device 10 becomes smaller, and the light rays are gathered together, so that the capturing target 16 can be irradiated farther.

Further, it is also possible to protect human eyes while the light guide 12 is bent and deformed, thereby improving the fill light effect of the fill light device 10 and eliminating the red eye effect during close-range capturing. When in use, the distance between the capturing target and the fill light device 10 is detected through the diastimeter 14, and the pupil recognition is performed by the recognition module 18. When the distance between the capturing target and the fill light device 10 is within a preset distance range and the pupil is recognized, the light-emitting angle of the fill light device 10 is determined according to the distance between the capturing target and the fill light device 10, the light-shielding area of the flash 11 is determined according to the position of the pupil, and the bending deformation of the light guide 12 is controlled and the light-shielding area is formed simultaneously. When the shutter is clicked to start taking a photo, the fill light device 10 receives the photo signal, and the current starts to light up. Since the light guide 12 is bent into a convex lens shape, the light-emitting angle of the fill light device 10 becomes smaller, the light is gathered, and the fill light effect is better. In addition, some lights are blocked to avoid direct exposure to the eye area, realizing human eye protection, improving the red-eye phenomenon, and thus improving the portrait capturing effect at close range.

In this embodiment, the fill light device 10 is applied to a mobile terminal. The camera module and flash light 11 are located on a side where the rear case of the mobile terminal locates. As shown in FIGS. 4 and 6, the camera module 15 includes a first camera 151 and a second camera 152. The first camera 151, the second camera 152, and the flash light 11 are arranged in sequence, thereby enriching the capturing function of the camera and improving the capturing effect.

The fill light device of the present disclosure can protect human eyes when taking photos under strong light at night, so that the brightness of the fill light device can be increased to improve the capturing effect. When taking photos at close range, there is no direct light to the human eye, which can eliminate the red-eye effect. When capturing a distant view or lighting at night, the fill light device can be switched to the distant mode to illuminate, so that the distant scene flash imaging effect is better, and the light angle of the fill light device can be switched, thereby realizing the near and far scene lighting, and improving the utilization efficiency of the flash light. When capturing a distant view or lighting at night, you can switch to the distant view mode according to the distance when the video is constantly brightly recorded. It supports the constant bright and distant scene switching during video recording to meet the scene recording effect.

The fill light device of the present disclosure includes a flash light and a light guide. The light guide is located on a light-exiting side of the flash light and configured to be controlled to change a shape and/or a light-transmitting area to change a light-exiting area and/or a light-emitting angle of the fill light device. In this way, the present disclosure can control the light-exiting area and/or the light-emitting of the fill light device to meet the fill light requirements in different capturing scenarios.

Second Embodiment

Figure 7:
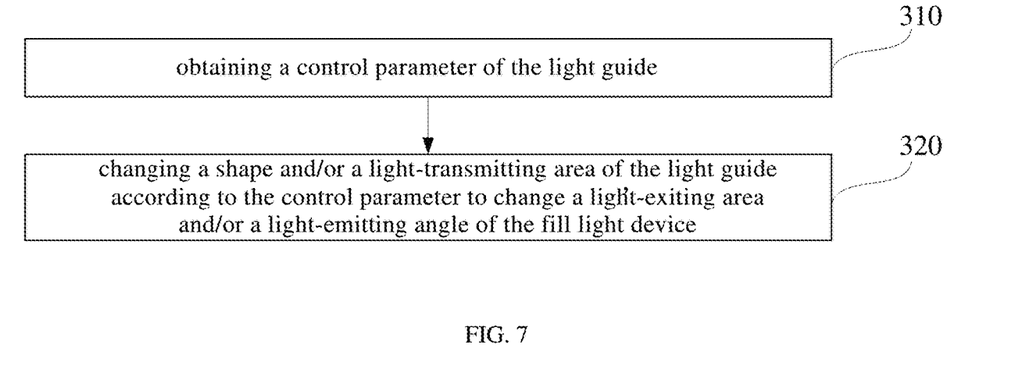
FIG. 7 is a schematic flowchart of a method for controlling a fill light device according to a second embodiment of the present disclosure.

FIG. 7 is a schematic flowchart of a method for controlling a fill light device according to a second embodiment. As shown in FIG. 7, the method for controlling the fill light device of this embodiment is applied to the fill light device of the first embodiment, including but not limited to the following operations:

Operation S310, obtaining a control parameter of the light guide; and

Operation S320, changing a shape and/or a light-transmitting area of the light guide according to the control parameter to change a light-exiting area and/or a light-emitting angle of the fill light device.

In this embodiment, the control parameter includes a light-emitting angle and/or a light-exiting area of the light guide, the operation 310 of obtaining a control parameter of the light guide includes:

obtaining a preview image of a camera module;

identifying a pupil in the preview image; and determining a light-shielding area of the light guide according to a position of the pupil to obtain the control parameter after the preview image is identified.

In this embodiment, the flash light is controlled to pre-flash at a preset power for a preset number of times or the flash light is controlled to continue lighting during the process of obtaining the preview image.

The light guide includes a first polarizer, a liquid crystal layer, and a second polarizer arranged in sequence, and the operation 320 of changing a shape and/or a light-transmitting area of the light guide according to the control parameter includes:

controlling an orientation of a liquid crystal of the liquid crystal layer according to the light-shielding area, thereby the light guide is opaque in the light-shielding area.

In this embodiment, the fill light device further includes a diastimeter for detecting a distance between a capturing target and the fill light device, and the operation 310 of obtaining a control parameter of the light guide includes:

obtaining the distance between the capturing target and the fill light device; and obtaining a first preset light-emitting angle as a target light-emitting angle to obtain the control parameter, or obtaining a light-emitting angle corresponding to the distance as a target light-emitting angle to obtain the control parameter, in response to a determination that the distance is greater than or equal to a preset distance;

obtaining a second preset light-emitting angle as a target light-emitting angle to obtain the control parameter in response to a determination that the distance is less than the preset distance, the second preset light-emitting angle being greater than the first preset light-emitting angle.

When the distance is greater than or equal to the preset distance, the target light-emitting angle may be a fixed smaller light-emitting angle, or may be determined according to the preset relationship between the distance and the light-emitting angle, that is, different distances correspond to different light-emitting angles.

In this embodiment, the light guide is connected to a deformation driving assembly for driving the light guide to deform, and the operation of changing a shape and/or a light-transmitting area of the light guide according to the control parameter includes:

determining a driving stroke of the deformation driving assembly according to the target light-emitting angle; and controlling the deformation driving assembly to drive the light guide to deform according to the driving stroke to change the shape of the light guide.

The deformation driving assembly includes magnets, a coil, and a driving ring, the driving ring is configured to surround the light guide one circle, the coil is configured to surround the driving ring, and the magnets are located on opposite sides of the driving ring, and the operation of controlling the deformation driving assembly to drive the light guide to deform according to the driving stroke includes:

obtaining an energizing current of the coil according to the driving stroke; and energizing the coil according to the energizing current, thereby the driving ring is driven to push up the light guide for deformation.

The energizing current of the coil affects the size of the magnetic field, which in turn affects the moving distance of the driving ring, corresponding to different degrees of deformation of the light guide.

In this embodiment, after the operation of changing a shape and/or a light-transmitting area of the light guide according to the control parameter to change a light-exiting area and/or a light-emitting angle of the fill light device, the method further includes:

controlling the flash light to flash or continue lighting according to a capturing operation or a lighting operation.

When receiving the capturing operation, the flash light is controlled to flash according to the selected light brightness for auxiliary lighting, or, when receiving the lighting operation, the flash light is controlled to continue to illuminate, and can record video or use as a flashlight when it is constantly on.

In this embodiment, the fill light device is a mobile terminal.

The execution process of each operation in the method for controlling the fill light device of this embodiment is described in detail in the related description of the first embodiment, and will not be repeated here.

The present disclosure provides a method for controlling a light device, including: obtaining a control parameter of the light guide; and changing a shape and/or a light-transmitting area of the light guide according to the control parameter to change a light-exiting area and/or a light-emitting angle of the fill light device. As such, the light-exiting area and/or the light-emitting angle of the fill light device can be controlled to meet the fill light requirements in different capturing scenarios.

The present disclosure further provides a computer readable storage medium. A computer program instruction is stored on the computer storage medium, the computer program instruction, when executed by a processor, implements the method for controlling the fill light device.

Figure 8:
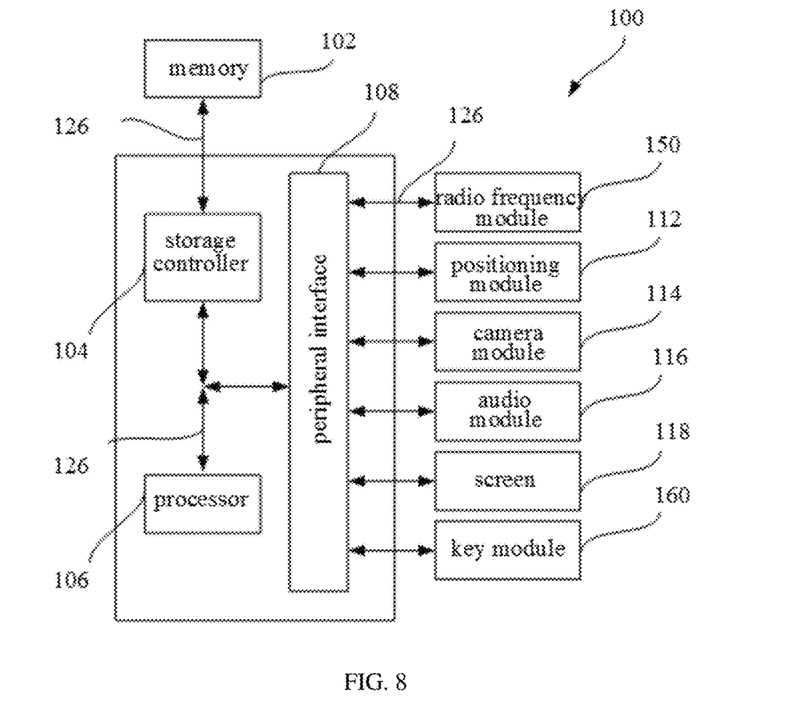
FIG. 8 is a schematic structural diagram of a terminal according to an exemplary embodiment of the present disclosure.

FIG. 8 is a schematic structural diagram of a terminal according to an exemplary embodiment. The fill light device and the method for controlling the fill light device of the present disclosure may be, but not limited to, applied to the terminal shown in FIG. 8. As shown in FIG. 8, the terminal 100 includes a memory 102, a storage controller 104, one or more (only one shown in the Figure) processors 106, a peripheral interface 108, a radio frequency module 150, a positioning module 112, a camera module 114, an audio module 116, a screen 118, and a key module 160. These components communicate with each other via one or more communication buses/signal lines 126.

It may be understood that the structure shown in FIG. 8 is merely an illustration, and the terminal 100 may further include more or fewer components than those shown in FIG. 8 or have a configuration different from that shown in FIG. 8. Each component shown in FIG. 8 may be implemented using hardware, software, or a combination thereof.

The memory 102 may be configured to store a software program and a module, such as a program instruction/module corresponding to the method for controlling the fill light device in the embodiments of the present disclosure. The processor 106 executes various functional applications and data processing by running the software program and the module stored in the storage controller 104, thereby implementing the method for controlling the fill light device as described above.

The memory 102 may include a high-speed random access memory, and may also include a non-volatile memory, such as one or more magnetic storage devices, flash memory, or other non-volatile solid-state memory. In some examples, the memory 102 may further include memories remotely provided with respect to the processor 106, and these remote memories may be connected to the terminal 100 through a network. Examples of the above network include but are not limited to an Internet, an intranet, a local area network, a mobile communication network, and combinations thereof. The processor 106 and other possible components can access the memory 102 under the control of the storage controller 104.

The peripheral interface 108 couples various input devices to the CPU and the memory 102. The processor 106 runs various software and instructions on the memory 102 to perform various functions of the terminal 100 and perform data processing.

In some embodiments, the peripheral interface 108, the processor 106, and the memory controller 104 may be implemented in a single chip. In some other examples, they can be implemented by separate chips.

The radio frequency module 150 is used to receive and transmit electromagnetic waves, thereby realizing the mutual conversion of electromagnetic waves and electrical signals, and thus communicating with a communication network or other devices. The radio frequency module 150 may include various existing circuit elements for performing these functions, for example, an antenna, a radio frequency transceiver, a digital signal processor, an encryption/decryption chip, a subscriber identity module (SIM) card, a memory, and so on. The radio frequency module 150 can communicate with various networks such as an Internet, an intranet, and a wireless network or communicate with other devices through a wireless network. The aforementioned wireless network may include a cellular telephone network, a wireless local area network, or a metropolitan area network. The above wireless network can use various communication standards, protocols and technologies, including but not limited to global system for mobile communication (GSM), enhanced data GSM Environment (EDGE), wideband code division multiple access (W-CDMA), code division access (CDMA), time division multiple access (TDMA), Bluetooth, Wireless Fidelity (WiFi) (American Institute of Electrical and Electronics Engineers standard IEEE 802.11a, IEEE 802.11b, IEEE802.11g and/or IEEE 802.11n), Voice over Internet Protocol (VoIP), Worldwide Interoperability for Microwave Access (Wi-Max), other protocols used for mail, instant messaging and short messages, as well as any other suitable communication protocols, even those protocols that have not yet been developed.

The positioning module 112 is used to obtain the current position of the terminal 100. Examples of the positioning module 112 include, but are not limited to, global satellite positioning system (GPS), positioning technology based on a wireless local area network or a mobile communication network.

The camera module 114 is used to take photos or videos. The captured photos or videos may be stored on the memory 102 and may be sent through the radio frequency module 150.

The audio module 116 provides an audio interface to the user, which may include one or more microphones, one or more speakers, and audio circuits. The audio circuit receives sound data from the peripheral interface 108, converts the sound data into electrical information, and transmits the electrical information to the speaker. The speaker converts electrical information into sound waves that can be heard by the human ear. The audio circuit also receives electrical information from the microphone, converts the electrical signal into sound data, and transmits the sound data to the peripheral interface 108 for further processing. The audio data may be obtained from the memory 102 or through the radio frequency module 150. In addition, the audio data may also be stored on the memory 102 or sent through the radio frequency module 150. In some examples, the audio module 116 may further include an earphone broadcasting hole, which is used to provide an audio interface to the earphone or other devices.

The screen 118 provides an output interface between the terminal 100 and the user. Specifically, the screen 118 displays video output to the user, and the content of these video outputs may include text, graphics, video, and any combination thereof. Some output results correspond to some user interface objects. It can be understood that the screen 118 may also include a touch screen. The touch screen provides an output and input interface between the terminal 100 and the user. In addition to displaying video output to the user, the touch screen also receives user input, such as user clicks, swipes, and other gesture operations, so that user interface objects respond to these user inputs. The technology for detecting user input may be based on resistive, capacitive, or any other possible touch detection technology. Specific examples of touch screen display units include, but are not limited to, liquid crystal displays or light emitting polymer displays.

The key module 160 also provides an interface for the user to input to the terminal 100. The user can press different keys to cause the terminal 100 to perform different functions.

The above-mentioned embodiments only exemplarily illustrate the principle and efficacy of the present disclosure, and are not intended to limit the present disclosure. Anyone skilled in the art can modify or change the above embodiments without departing from the spirit and scope of this disclosure. Therefore, all equivalent modifications or changes made by those with ordinary knowledge in the art without departing from the spirit and technical ideas disclosed in this disclosure should still be covered by the claims of the present disclosure.

INDUSTRIAL APPLICABILITY

The fill light device of the present disclosure includes a flash light; and a light guide, the light guide being located on a light-exiting side of the flash light and being configured to be controlled to change a shape and/or a light-transmitting area to change a light-exiting area and/or a light-emitting angle of the fill light device. The method for controlling the fill light device includes: obtaining a control parameter of the light guide; and changing a shape and/or a light-transmitting area of the light guide according to the control parameter to change a light-exiting area and/or a light-emitting angle of the fill light device. As such, the light-exiting area and/or the light-emitting angle of the fill light device of the present disclosure can be controlled to meet the fill light requirements in different capturing scenarios.

What is claimed is:

1. A method for controlling a fill light device, the fill light device comprising a flash light and a light guide, the light guide being located on a light-exiting side of the flash light, wherein the method comprises:
   obtaining a control parameter of the light guide; and
   changing a shape and/or a light-transmitting area of the light guide according to the control parameter to change a light-exiting area and/or a light-emitting angle of the fill light device; wherein:
   the operation of obtaining a control parameter of the light guide comprises:
   obtaining a preview image of a camera module;
   identifying a pupil in the preview image; and
   determining a light-shielding area of the light guide according to a position of the pupil to obtain the control parameter after the pupil in the preview image is identified.

2. The method for controlling a fill light device of claim 1, further comprising:
   controlling the flash light to pre-flash at a preset power for a preset number of times or controlling the flash light to continue lighting during a process of obtaining the preview image.

3. The method for controlling a fill light device of claim 1, wherein the light guide comprises a first polarizer, a liquid crystal layer, and a second polarizer arranged in sequence, and
   the operation of changing a shape and/or a light-transmitting area of the light guide according to the control parameter comprises:
   controlling an orientation of a liquid crystal of the liquid crystal layer according to the light-shielding area, thereby the light guide is opaque in the light-shielding area.

4. The method for controlling a fill light device of claim 1, wherein the fill light device further comprises a diastimeter for detecting a distance between a capturing target and the fill light device, and the operation of obtaining a control parameter of the light guide comprises:

obtaining the distance between the capturing target and the fill light device; and obtaining a first preset light-emitting angle as a target light-emitting angle to obtain the control parameter, or obtaining a light-emitting angle corresponding to the distance as a target light-emitting angle to obtain the control parameter, in response to a determination that the distance is greater than or equal to a preset distance.

5. The method for controlling a fill light device of claim 4, wherein the operation of obtaining a control parameter of the light guide further comprises:

obtaining a second preset light-emitting angle as a target light-emitting angle to obtain the control parameter in response to a determination that the distance is less than the preset distance, the second preset light-emitting angle being greater than the first preset light-emitting angle.

6. The method for controlling a fill light device of claim 4, wherein the light guide is connected to a deformation driving assembly for driving the light guide to deform, and the operation of changing a shape and/or a light-transmitting area of the light guide according to the control parameter comprises:

determining a driving stroke of the deformation driving assembly according to the target light-emitting angle; and controlling the deformation driving assembly to drive the light guide to deform according to the driving stroke to change the shape of the light guide.

7. The method for controlling a fill light device of claim 6, wherein the deformation driving assembly comprises magnets, a coil, and a driving ring, the driving ring is configured to surround the light guide one circle, the coil is configured to surround the driving ring, and the magnets are located on opposite sides of the driving ring, and the operation of controlling the deformation driving assembly to drive the light guide to deform according to the driving stroke comprises:

obtaining an energizing current of the coil according to the driving stroke; and energizing the coil according to the energizing current, thereby the driving ring is driven to push up the light guide for deformation.

8. The method for controlling a fill light device of claim 1, wherein after the operation of changing a shape and/or a light-transmitting area of the light guide according to the control parameter to change a light-exiting area and/or a light-emitting angle of the fill light device, the method further comprises:

controlling the flash light to flash or continue lighting according to a capturing operation or a lighting operation.

9. A fill light device, comprising:

a flash light; and a light guide, the light guide being located on a light-exiting side of the flash light and being configured to be controlled to change a shape and/or a light-transmitting area to change a light-exiting area and/or a light-emitting angle of the fill light device; wherein:

the light guide comprises a first polarizer, a liquid crystal layer, and a second polarizer arranged in sequence, the light guide is connected to a liquid crystal driving module, and the liquid crystal driving module is configured to control an orientation of a liquid crystal of the liquid crystal layer to change the light-transmitting area of the fill light device.

10. The fill light device of claim 9, wherein the light guide is connected to a deformation driving assembly, and the deformation driving assembly is configured to drive the light guide to deform to change the shape of the light guide.

11. The fill light device of claim 9, wherein the fill light device further comprises a diastimeter for detecting a distance between a capturing target and the fill light device, thereby the fill light device is configured to change the shape of the light guide according to the distance to change the light-emitting angle of the fill light device.

12. The fill light device of claim 9, wherein the fill light device further comprises an identification module, the identification module is configured to identify a pupil in a preview image and determine a position of the pupil, thereby the fill light device is configured to change the light-transmitting area of the light guide according to the position of the pupil to change the light-exiting area of the fill light device.

* * * * *